United States Patent
Lissone (10) Patent No.: US 9,607,432 B2
(45) Date of Patent: Mar. 28, 2017

(54) SYSTEMS AND METHODS FOR HYBRID PROCESS MINING AND MANUAL MODELING WITH INTEGRATED CONTINUOUS MONITORING

(71) Applicant: BWISE, Rosmalen (NL)

(72) Inventor: Anton Lissone, Tilburg (NL)

(73) Assignee: BWISE, Rosmalen (NL)

( * ) Notice: Subject to any disclaimer, the term of this patent is extended or adjusted under 35 U.S.C. 154(b) by 264 days.

(21) Appl. No.: 14/223,156

(22) Filed: Mar. 24, 2014

(65) Prior Publication Data
US 2015/0269774 A1    Sep. 24, 2015

(51) Int. Cl.
| | | |
|---|---|---|
| G06T 11/20 | (2006.01) | |
| G06T 17/10 | (2006.01) | |
| G06Q 10/06 | (2012.01) | |
| G06T 19/20 | (2011.01) | |

(52) U.S. Cl.
CPC ......... *G06T 17/10* (2013.01); *G06Q 10/0635* (2013.01); *G06T 11/206* (2013.01); *G06T 19/20* (2013.01); *G06T 2219/2004* (2013.01)

(58) Field of Classification Search
None
See application file for complete search history.

(56) References Cited

U.S. PATENT DOCUMENTS

| | | | | |
|---|---|---|---|---|
| 2006/0265257 A1* | 11/2006 | Pulfer | .................... | G06Q 10/06 705/7.28 |
| 2008/0120153 A1* | 5/2008 | Nonemacher | ............. | G06F 8/10 705/7.26 |
| 2009/0132562 A1* | 5/2009 | Mehr | ........................ | G06F 8/10 |
| 2010/0235839 A1* | 9/2010 | Hu | ........................ | G06F 9/5038 718/100 |
| 2011/0218843 A1* | 9/2011 | Goel | ................ | G06Q 10/06393 705/7.39 |
| 2012/0059683 A1* | 3/2012 | Opalach | ............. | G06Q 10/0633 705/7.27 |
| 2013/0311242 A1* | 11/2013 | Duftler | .................. | G06Q 10/06 705/7.36 |
| 2014/0058789 A1* | 2/2014 | Doehring | ............. | G06Q 10/067 705/7.27 |
| 2014/0067836 A1* | 3/2014 | Holmes | ............. | G06F 17/30554 707/756 |

FOREIGN PATENT DOCUMENTS

WO    WO 2013/177178    11/2013

OTHER PUBLICATIONS

International Search Report issued in Application Serial No. PCT/EP2015/055605 dated Jun. 15, 2015.
Written Opinion issued in Application Serial No. PCT/EP2015/055605 dated Jun. 15, 2015.
Rozinat, Anne, "Disco Tour", fluxicon, pp. 1-13, Friday, Jun. 28, 2013.
U.S. Appl. No. 13/835,458, filed Mar. 15, 2013.

* cited by examiner

*Primary Examiner* — Ryan M Gray
(74) *Attorney, Agent, or Firm* — Nixon & Vanderhye P.C.

(57) ABSTRACT

A computer system for hybrid process modeling is provided. A graphical model of a process and transaction events of executed instances of the process are stored. Types of the transactional events are mapped to the elements of the graphical model. A performance values is derived for at least one of the graphical model elements based on transaction events that are associated with that graphical model element. A hybrid version of the graphical model is generated with the derived performance values.

17 Claims, 11 Drawing Sheets

SYSTEMS AND METHODS FOR HYBRID PROCESS MINING AND MANUAL MODELING WITH INTEGRATED CONTINUOUS MONITORING

CROSS REFERENCE TO RELATED APPLICATIONS

This application incorporates by reference U.S. application Ser. No. 13/835,458, filed Mar. 15, 2013, the entire contents of which are hereby incorporated by reference.

TECHNICAL OVERVIEW

The technology herein relates to automatic generation of process models that are based on executed processes and manually created process models. More particularly, the technology herein relates to integrating auto generated models with manually created models.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Process modeling is a technique used to show how a given process operates (or is supposed to operate). For example, an enterprise that sells computers may receive orders from customers, generate an invoice for that order, determine if parts need to be ordered to build that computer, and generate a shipping manifest for the ordered computer. A model of these processes can help companies to better understand and analyze how their processes are being (or will be) implemented, which may lead to new process efficiencies.

One technique in modeling a process is to model the process with modeling software where a person creates a model based on their knowledge about how a business process works. The created model can then be referred to (either manually or automatically) by an organization when an instance (e.g., handling a new order) of the process is being executed.

Another technique for creating a process model uses process mining to auto-generate a model based on occurrences of events in a process or data associated with occurred events (including timestamps, actors, events, identifiers, purchase order information, etc) that are recorded to a computer system. The events may be expressly stored to a storage system, for example, a computer program that generates a purchase order may also generate log information (e.g. a transaction database entry or the like) upon creation of the purchase order. Similar entries (from the same program or other programs) may be stored for other types of events in the process (e.g., creating a shipping manifest, assembly of the product, etc).

In certain instances, process mining is performed with an artifact centric process mining technique where the events are derived, or may also be derived, from the existence of "artifacts" of the process within the computing system as opposed to directly retrieved from logged events. In other words, a record in a database or a document with line items for a purchase order may be used to infer the event that created the record or document (and its sub components). For example, events may be generated from artifacts (e.g., documents, line items, events, changes to objects, and the like) of an ERP (Enterprise Resource Planning) application. As such, a log file containing a recordation of a purchase order event may not be the only relevant item used in certain example processing mining techniques.

Processing mining thus takes these "transaction events" and creates a "mined model" from those events.

A potential problem with process mining is that the created mined model may not be suitable for non-expert users (e.g., business centric users) because the model is too technical in nature. In other words, when a process model is generated using process mining, the number of events that are recorded by a system may be relatively large compared to the basic business process for which they are associated. For example, five different event types may be generated for a single element that is included in a human created model (e.g., generate purchase order).

This results in a model that is very complex and possibly too detailed for certain user types. This complexity decreases the value of the provided information because it may not be suitable for work instruction, training, day-to-day monitoring (e.g., transaction monitoring) of the underlying processes by process owners (e.g., non-technical users), etc. For example, it can be difficult to appropriately determine a root cause of why a particular transaction of a process is running out of bounds if a mined model is being analyzed. This is because determining which events are related to a general process model element (e.g., generate purchase order) may be difficult.

Attempting transactional monitoring with a human drawn model can be problematic too because it requires the drafter of the human model to know what exceptions to look for. In other words, the creator of the model needs to know what the expected problems are before the model is actually implemented.

Thus, both types of models (human drawn and mined models) can provide benefits for organizations seeking to better understand/control their business processes. However, there also exists a need to provide new, improved, or different ways of visualizing, managing, and tracking process models so that users can more quickly see or determine how a business process is being implemented.

SUMMARY

Certain example embodiments provide a combined transaction monitoring, human drawn process model, and mined model platform that can be used for point-in-time assessments of process integrity, efficiency, and effectiveness. This combined platform may allow a user group that includes both technical and non-technical users to perform analysis on a daily basis for process models that are associated with generated events for that process.

In certain example embodiments, a computer system for hybrid modeling of a process that includes a plurality of process steps is provided. The process is implemented in a computing environment where transactional data is generated based on each execution of the process in the computing environment. The computing system includes a computer storage medium and a processing system that includes at least one processor coupled the computer storage medium. The storage medium stores a created graphical model, recorded transactional events, and mappings of the transaction event types to the graphical models elements. The created graphical model of the process includes graphical model elements that correspond to the process steps. The recorded transactional events are recorded based on executed transactions of the computerized implementation of the process, where the transactional events are divided into different transaction event types. The mappings of the transaction event types to the graphical models elements are mapping where one of the graphical model elements is mapped to plural different transactional event types of the different transaction event types.

The processing system is configured to derive a performance value for the one graphical model element based on multiple transactional events that are of the plural different transactional event types mapped to the one graphical model element. The processing system is also configured to generate an annotated and/or hybrid version of the created graphical model that includes a graphical representation of the derived performance value so as to be displayed in association with the graphical model element.

In certain examples, a display device is used to display the hybrid version of the model. In certain examples, a user input device is configured to accept input from a user while the hybrid version of the created graphical model is displayed on the display device, the accepted input corresponds to a selected graphical model element of the plurality of graphical models elements. The processing system is further configured to generate a drill down view in accordance with the selected graphical model element, the generated drill down view includes a graphical display of data that corresponds to each transaction event type associated with the selected graphical model element.

In certain example embodiments, a derived performance value for the one graphical model element is a first performance value where the computer storage medium is further configured to store a second performance value for the one graphical model element that is based on prior transactional events, where the second performance value is different from the first performance value. The processing system performs a comparison between the first performance value to the second performance value. In certain examples, the comparison is automatically performed and an alert is automatically generated based on the performed comparison. The alert may be incorporated into the hybrid version of the model and displayed as a part thereof.

The second performance value may be include at least one of the following (1) an average of a plurality of previously-calculated performance values, and (2) a prior performance value for a specific time period.

In certain example embodiments, a constraint is stored that is associated with at least one of the plurality of graphical model elements. The processing system automatically performs a determination of whether the constraint associated with the at least one of the plurality of graphical model elements has been violated based on recorded transactional events.

In certain examples, the derived performance value includes at least one of: a) an average throughput time of the graphical model element based on each computerized implementation of the process; or b) a value that indicates a number of times the process has been run on the computing environment.

A method may be implemented using a computer system according to certain example embodiments. In certain examples, a non-transitory computer-readable storage medium may store configuration information (instructions or computer code) for a computing system. These instructions may configure a computing system (e.g., a general purpose computer) in a specific manner according to the examples herein.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail. Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on non-transitory computer-readable storage medium and when the instructions are executed by a computer or other suitable processor control, the computer or processor performs the functions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process is a description of an apparatus for performing the process. The apparatus that performs the process may include, e.g., a processor and those input devices and output devices that are appropriate to perform the process.

Various forms of non-transitory, computer-readable media may be involved in carrying data (e.g., sequences of instructions) to a processor. For example, data may be (i) delivered from RAM to a processor; (ii) carried over any type of transmission medium (e.g., wire, wireless, optical, etc.); (iii) formatted and/or transmitted according to numerous formats, standards or protocols, such as Ethernet (or IEEE 802.3), SAP, ATP, Bluetooth, and TCP/IP, TDMA, CDMA, 3G, etc.; and/or (iv) encrypted to ensure privacy or prevent fraud in any of a variety of ways well known in the art.

A process, such as a business process, may include a set of activities, tasks, or steps that are used to produce a product or carry out a service. In certain instances, a process is implemented (in part or completely) on computer system. For example, a user may enter (or cause to be entered) a new purchase order for a copy machine in an electronic purchase order system. In response to the request for the new purchase order, other tasks (or even other processes that include tasks) may be triggered, such as generating a shipping manifest. Thus, each time a new copy machine is ordered, the invoice process is also run. The execution of each individual task (e.g., enter tax information, update customer addresses information, add customer to a mailing list, etc) for these processes can generate transactional events that are stored in a database. Thus, for example, a database will record that a new purchase order for a particular copy machine model was placed on a certain date and time. Some of the events that are stored regarding the process can be associated with user actions, while others may be completely automated (e.g., calculation of the tax for this purchase). Events that are stored in a database or event log are generally stored with an associated timestamp to indicate when a particular event was completed, last modified, created, etc.

An executing process can also be modeled in a form that may be easy for an ordinary user (e.g., non-technical) to understand. A technique for accomplishing this is to create a graphical model that follows the process flow of the process that is being implemented. As used here-in, these types of models may be referred to as "human drawn models"—e.g., because they are manually created by a user of a computing system. Typically, a human drawn model is created independent of the execution of an actual process (e.g., it is generated before a company receives a purchase order). One example of this type of model is shown in connection with FIG. 2.

Events (or other information) stored in a database, event log, or the like as a result of executing an activity, task, or step of a process may be extracted and processed to form what may be known as a "mined model."

In certain example embodiments, the extracted information includes event information (e.g., on transactions) from an event log or the like. Alternatively, or in addition, the extracted information may include artifacts of an executed process—e.g., a completed purchase order process may result in multiple documents, records, or other information being generated by a computing system. This artifact information (e.g. a generated purchase order document, a payment receipt, a delivery receipt, etc) can be analyzed to infer that a purchase order transactional event occurred even if no such transactional record is present. The inferred information may then alternatively, or in addition, be used to generate to a mined model.

In certain examples, extracted information can be used to derive other types of events that may have or must have occurred. For example, a transactional event (explicit or implied) of "payment of an invoice" or "the delivery of goods" may be used to derive the transactional event that "receiving a purchase order" occurred even if such transactional event is missing or somehow not recorded.

Thus, it will be appreciated that there are varying techniques that can be used for generating or deriving the stored events (e.g., events that are inferred are stored to memory of a computing system) that make up a mined model.

In certain example embodiments, a mined model may be used to visualize the actual flow of a process based on events. This information can be used to visually show where problems or strange patterns occur in an executing process. One example of this type of model is shown in connection with FIG. 3A.

In certain example embodiments, information that is used to generate the mined model is depicted or mapped onto a human drawn model. Such a mapping, and the resulting information that is displayed, can assist in identifying process changes or errors in the human drawn models or the execution of an instance of the process.

In certain example embodiments, transaction monitoring may be integrated to allow for drilling down into the root causes and individual transactions that are mapped to the human drawn model. This can allow users to analyze specific transactions and their associated process so that proper remediation and follow-up may be accomplished. It will be appreciated that this type of functionality and data may not be available in "plain" human drawn or mined models.

Figure 1:
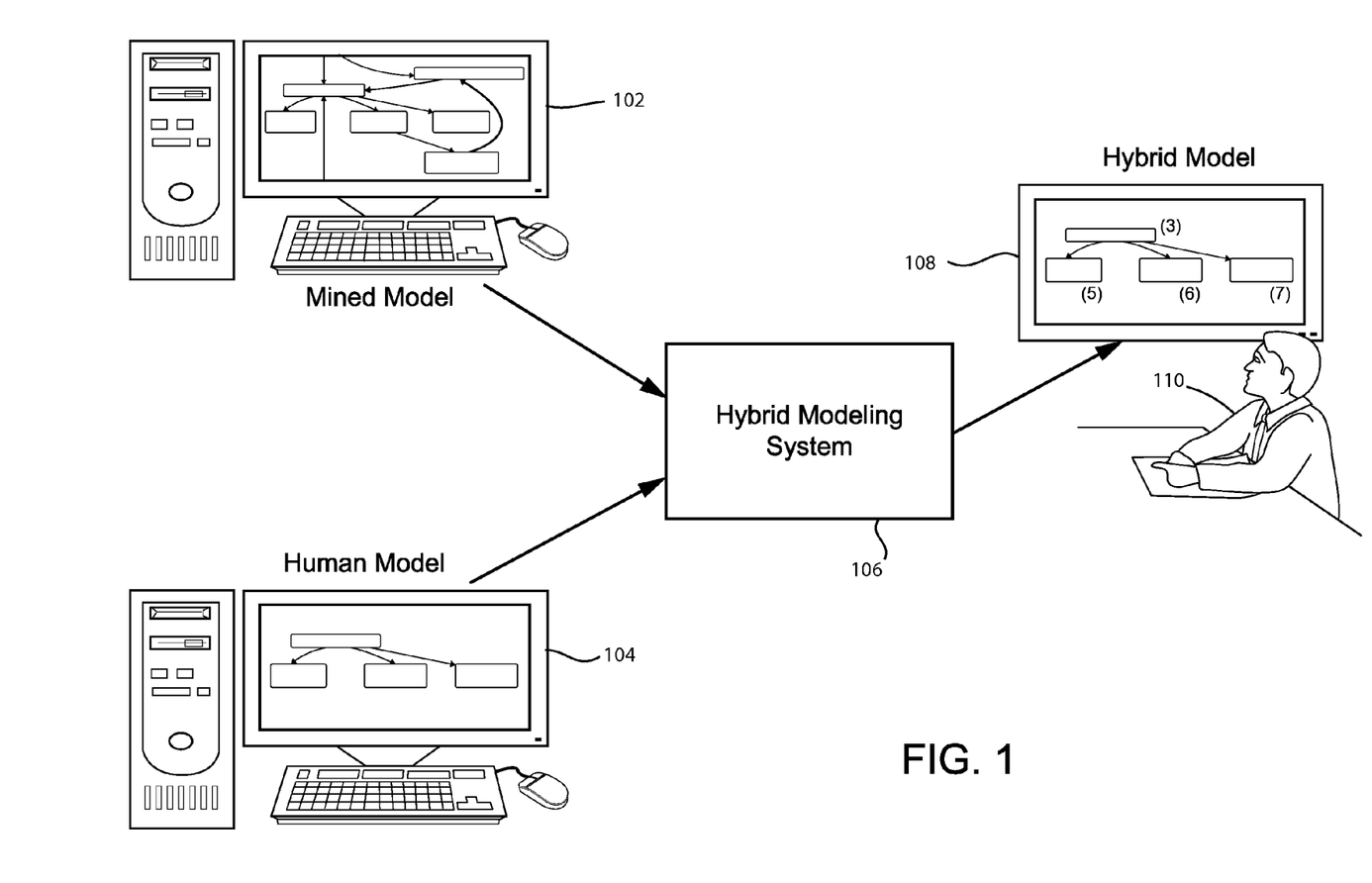
FIG. 1 illustrates a block diagram of a hybrid modeling system according to certain example embodiments.

FIG. 1 illustrates a block diagram of a hybrid modeling system according to certain example embodiments. A hybrid modeling system 106 may combine elements that are used in creating a mined model 102 with elements from a human drawn graphical model 104. The hybrid modeling system 106 combines these elements to create hybrid model 108.

The hybrid model 108 may provide detailed information that is contained in the mined model 102 with the simplicity of the human drawn model 104. Such a presentation may allow for a general business user 110 to effectively analyze how the computer assisted process that is being run over multiple instances (e.g., multiple purchase orders) is performing.

Figure 2:
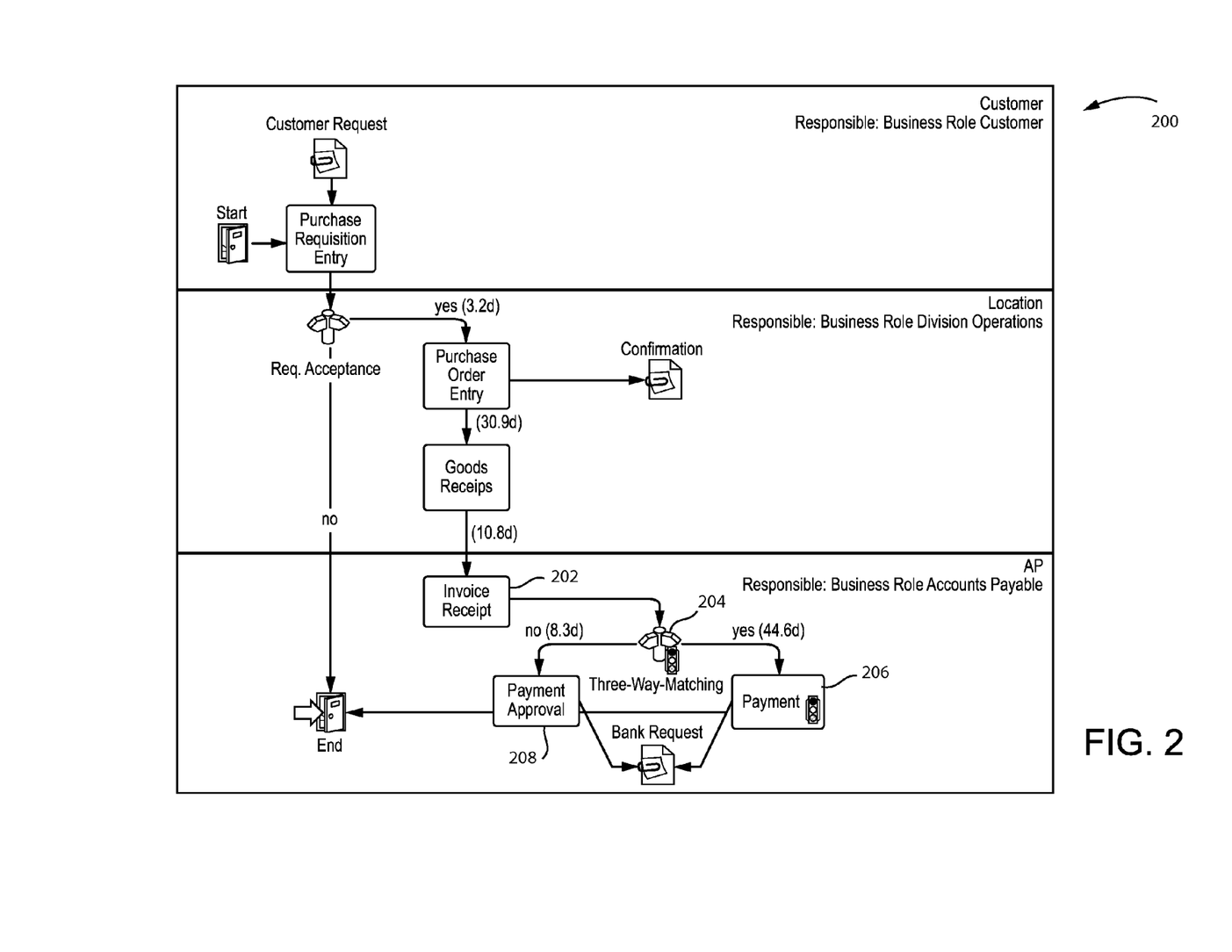
FIG. 2 illustrates an example process model according to certain example embodiments.

FIG. 2 illustrates an example process model according to certain example embodiments. Model 200 is based off of a human drawn model, but also contains information that is not normally included in a human drawn model. Specifically, the arrows and statistical numbers are derived from information that is used in the creation of a mined model. Accordingly, the model 200 is a hybrid model that combines a human drawn model with information (e.g., event based information) that is used in generation of a mined model.

The part of the model 200 that is derived from the human drawn part is the graphical model process elements like invoice receive 202, three-way-matching 204, payment 206, and payment approval 208. These graphical model elements are typically (but not always) previously defined by a human that created the "plain" human drawn model. Thus, a user may create a graphical model and store it to a computer system where it may be later annotated with data (e.g., to create a hybrid graphical model). Data is mapped to the human drawn model by expressly defined mapping information stored in the system. This mapping information associates particular transactional event types with elements of the human drawn model. In certain instances, the event type to model graphical model element relationship may be many-to-one.

The other portion of model 200 that is not based on the created graphical model is instead based on the event information that is used to generate a mined model. This includes the numbers and arrows show in FIG. 2. For example, model 200 indicates that invoices that are released for payment because of the applied three-way-match are paid, on average (over some select analysis period), after 44.6 days. The 44.6 days is based on the event information. In certain examples, the arrows that link the three-way-matching to the payment graphical element may change color depending on whether or not the determined performance characteristic (the average time invoices are released for payment) is above or below a set threshold. For example, the arrow may be green when the threshold is set to 30 days (e.g., for optimizing cash-flow). Note that if the invoices are not automatically matched, they are manual checked at payment approval 208 and then released for payment. In contrast, to the automatic route, this route takes on average 8.3 days, which means it may be below a previously defined 30 day threshold. This indicates that manual payment approvals are occurring too quickly and thus reducing cash flow for the enterprise. Accordingly, performance characteristics for the graphical elements may be derived from the underlying event driven data of executed process instances to create the hybrid process model shown in FIG. 2.

In certain example embodiments, the arrows that connect the different model elements may be adjusted in thickness to correspond to the number or severity of the process "taking" a particular path in the process.

In certain examples, the numbers shown in FIG. 2 are the average performance of the executed processes. The frequency of updates to the hybrid model may be manually or automatically driven—e.g., daily, weekly, etc. For example, a process may be run nightly to extract information from the various business systems that log event data for executed processes.

Figure 3A:
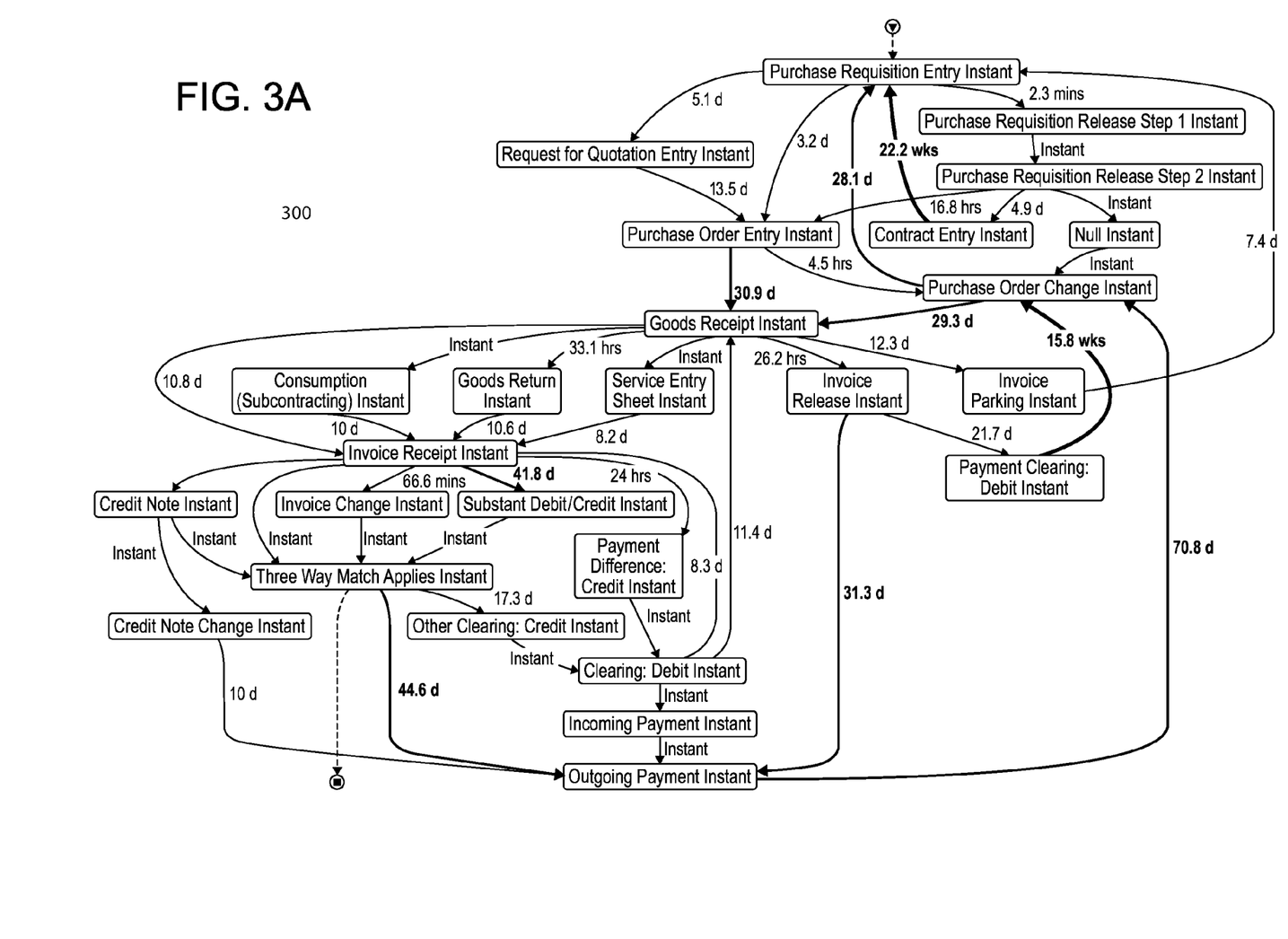
FIG. 3A illustrates an example mined model according to certain example embodiments that corresponds to the process model of FIG. 2.
Figure 3B:
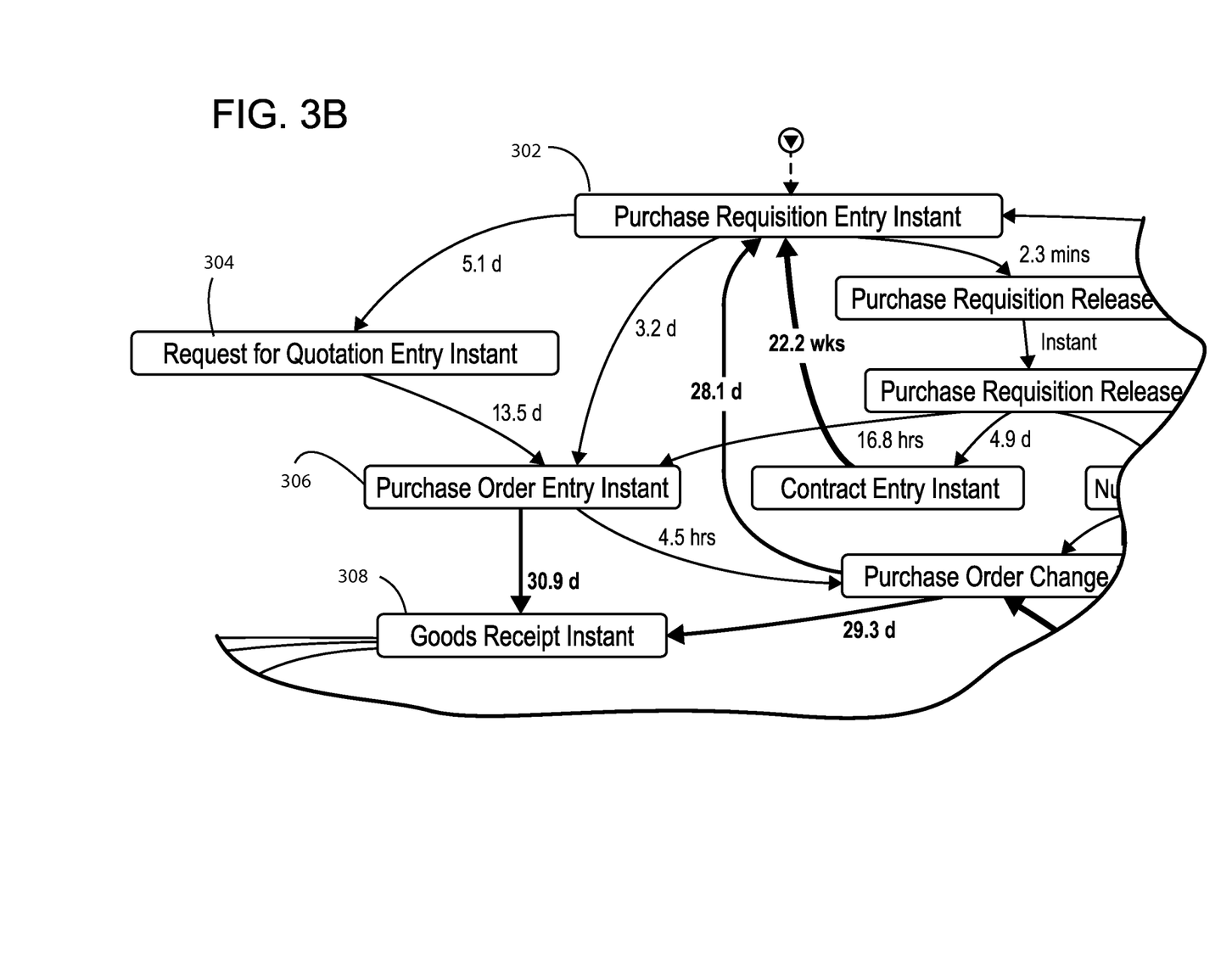
FIG. 3B is an enlarged view of a portion of the example mined model shown in FIG. 3A.

FIG. 3A illustrates an example mined model according to certain example embodiments that corresponds to the process model of FIG. 2 and FIG. 3B is an enlarged view of a portion of the mined model shown in FIG. 3A;

Here, each node in the mined model 300 relates to a discrete event type that is logged. In certain example embodiments, event logs are created from automated extraction of data from these various business systems—e.g., ERP (enterprise resource planning) applications and other business systems. The event logs (e.g., database entries) may be based on one system or multiple disparate systems.

The generated mined model may also automatically calculate the throughput time between the various nodes based on timestamp information associated with the event log entries. Accordingly, the time between node 302 and 304 is calculated to be 5.1 days, the time between node 304 and node 306 is 13.5 days, and the time between node 306 and node 308 may take, on average over all process instances that have been executed, 30.9 days.

The mined model 300 shown in FIG. 3A may be generated as an image file (PNG, GIF etc). Alternatively, or in addition, an XML file that contains statistics about the performance of the executed processes may be exported for future use (e.g., for use in a hybrid process model). In certain examples, information may be queried directly from an ERP system or the like and imported or used in the hybrid model. Commercially available software for extracting event log information from various business systems includes Disco from Fluxicon.

It will be appreciated that the end result shown in FIG. 3A may be more complex that the human drawn model associated with FIG. 2. Accordingly, quickly and effectively grasping how the average process performs (or a single process) may be difficult for certain types of users. However, the information that is contained in the mined model (e.g., throughput time, etc) can be valuable in assessing the overall "health" of the executing processes that are associated with the human drawn model.

Accordingly, as shown in FIG. 2, the data and events that make up the mined model shown in FIG. 3A are mapped to elements within the human drawn model of FIG. 2. For example, the events (e.g. purchase requisition entry 302, request quotation entry 304, purchase order entry 306, etc) are mapped to graphical model elements (sometimes called activities) of the human drawn model. After mapping the events to the graphical model elements, a throughput time (or other associated performance characteristic) may be calculated and displayed in conjunction with the human drawn model associated with FIG. 2.

Figure 4:
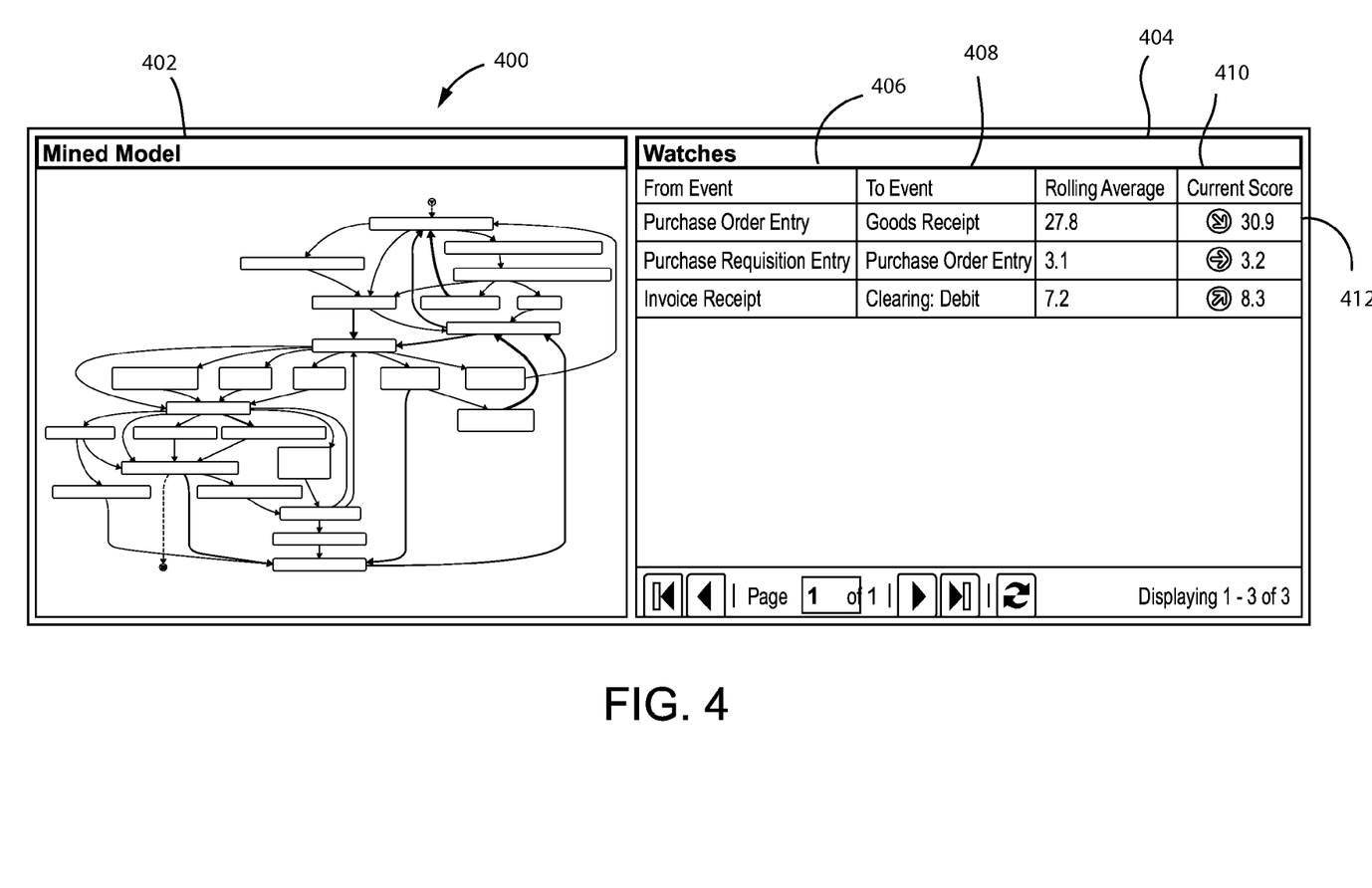
FIG. 4 is an example screen used to create and monitor watches that are set against a process model.

FIG. 4 is an example screen 400 used to create and monitor watches that are set against a mined model. A watch 404 is an alert with a threshold that is associated with a certain event or process element. As shown in FIG. 4 watches 404 include a "from" event 406, a "to" event 408, a rolling average column 410, and a current score column. While the watches that are defined are associated with the mined model 402, other watches may be expressly tied to a hybrid model that includes a version of the information that makes up the mined model. In other words, a watch may be triggered from information in the mined model and/or the hybrid model.

An example watch may monitor the average time from purchase order entry to good receipt and trigger an alert when the average is greater than 30 days. In certain instances, watches may be based on a single process instance. For example, a watch may be created to alert whenever the time from purchase order entry to good receipt for a particular process (as opposed to the average for process over a week) is greater than 60 days. This functionality thus allows users to show and analyze trends, benchmarks, etc so as to monitor cumulative process execution and/or individual process execution (e.g., optionally drill down to determine the root cause of a particular process abnormality).

In certain examples watches act as a constraint on the data that is being analyzed. These constraints can be based on previously recorded transactions (e.g., an average, lowest, highest, etc) or set values (e.g., invoices above 100 should be flagged).

A constraint can be automatically adjusted (e.g., based on a moving average or some prior-point-in-time value) or static (e.g., if it is above 30 days then a warning is issued).

In certain example embodiments, watches may be set to check for derivation of a performance value from one or more event types or a single event type. Usually a performance value is calculated for plural types (e.g., because the mined model includes multiple event types for a single graphical model element).

In certain examples, previous-in-time values may be compared against the current point-in-time values in order to allow for "trending" and detection of noteworthy/drill down worthy changes and setting of watches. For example, a rolling average of a given performance value (e.g., throughput time) and the current performance value can give a user a strong and quick indication that sometime maybe wrong with the process—e.g., the average time for task A is 10 days while the current time for task A 25 days. This can give a strong indication that something is wrong even if a current threshold (e.g., 30 days) is not being triggered. Thus, watches may be set to trigger if the current values is some percent away from a given value (e.g., a calculated average).

Accordingly, triggering a watch may provide users (e.g., a process owner) with the ability to investigate why a certain key performance indicator (KPI) is rising or lowering.

The watches and other techniques described herein may also provide for continuous (e.g., automatic) monitoring of the process and the transactional events that are associated with the process.

Figure 5:
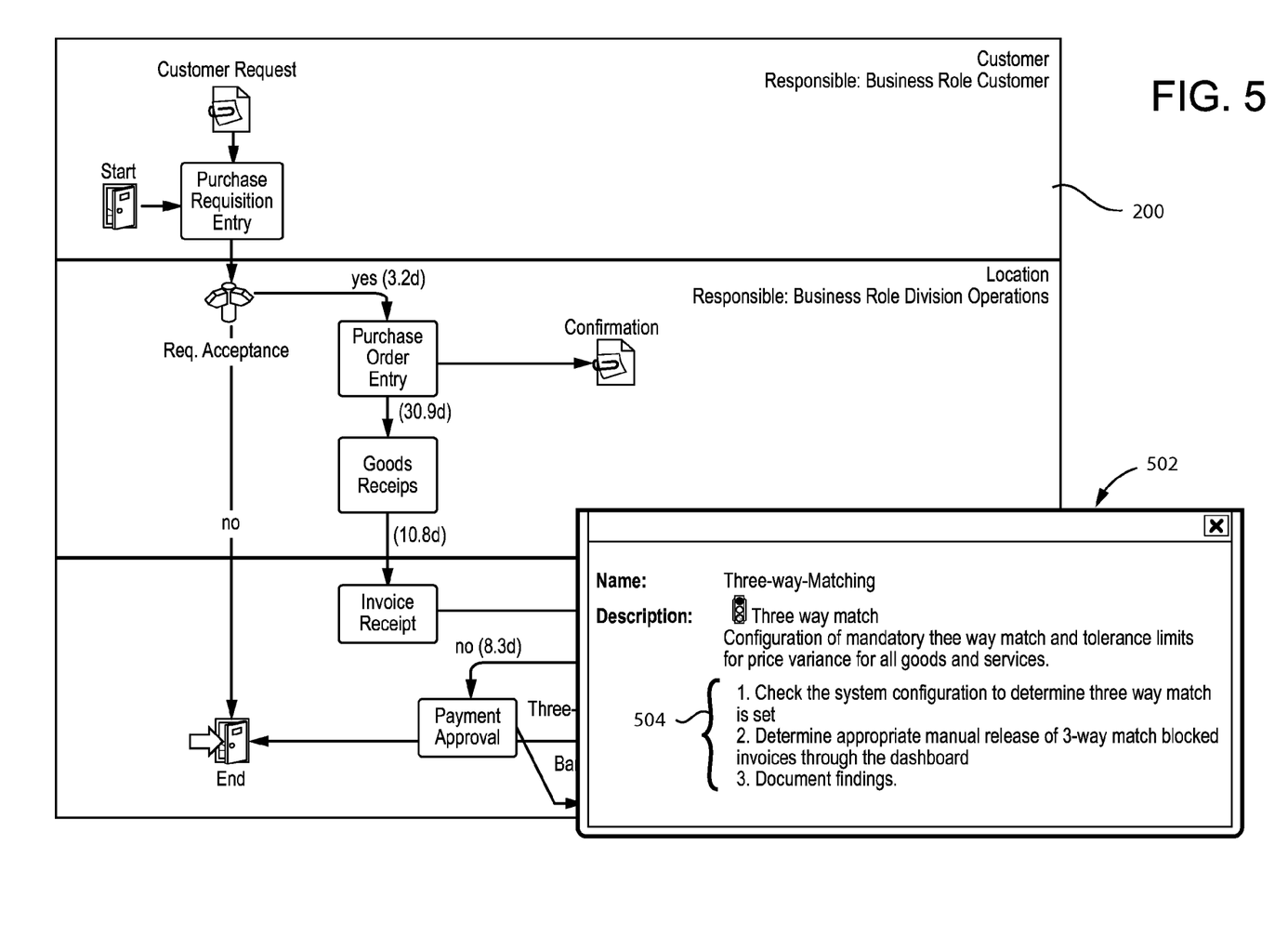
FIG. 5 illustrates the process model shown in FIG. 2 with further details on certain transaction monitoring that is implemented for the shown model.
Figure 6:
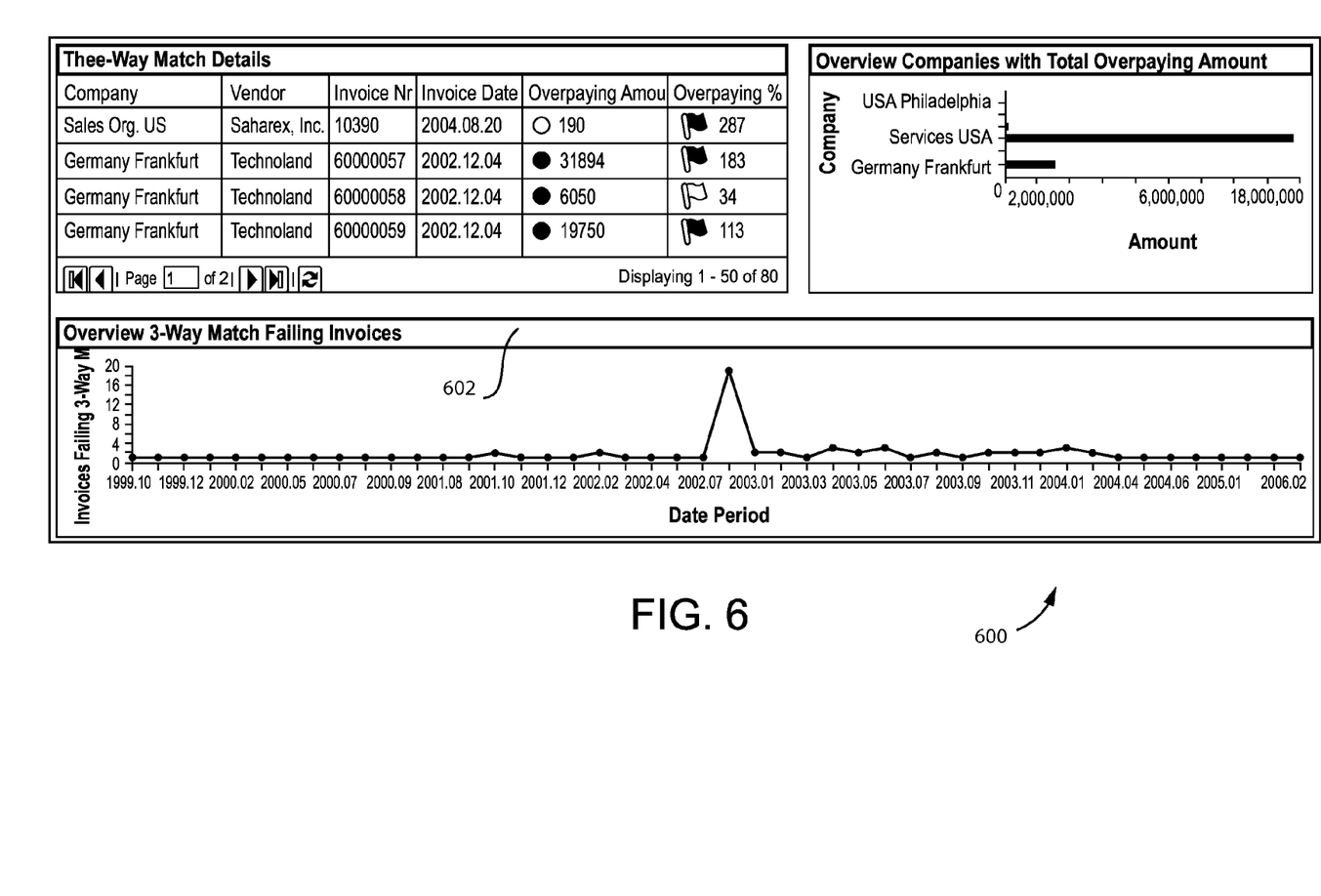
FIG. 6 is an example screen that shows a further drill down on the three-way match element of FIGS. 2 and 5.

FIG. 5 illustrates the process model shown in FIG. 2 with transaction monitoring and FIG. 6 is an example screen that shows a further drill down on the three-way match element of FIGS. 2 and 5.

A user that is presented with model 200 may mouse-over the three-way matching element 204 to show an informational window 502. This window may provide an explanation of the three-way matching element 204 and information on additional checks 504 that are used as key control points for the three-way matching portion of the process. In other words, three-way-matching (or other process elements) may have various sub-elements that make up the overall element that is included in the model. Window 502 thus provides further detailed information to requesting users.

The traffic sign (shown in FIG. 2) that is associated with the three-way matching element 204 may be associated with control measure data (e.g., the same data that is used to generate the mined model). Based on the control data, the traffic sign may change color to indicate if there is a problem with this element. A user can thus click on an element to drill-down and determine the causes for why that element is indicated as not healthy.

Specifically, clicking on the three-way match element 204 brings up a screen 600 that illustrates a drill-down for transaction monitoring results that are periodically analyzed (e.g., based on the watches set against the mined model) and automatically linked to the related element(s) of the human drawn model. Here screen 600 shows that the three-way matching is failing (e.g., why the traffic sign associated with that element turned red) because there are too many invoices (above a set threshold) that are being blocked because they include incorrect values that do not match the actual goods receipt (e.g., the invoice sent by the customer is incorrect).

Also shown is information that indicates for which sales organizations this is relevant and what the performance statistic (trend) is on the matching of those invoices. The spike in FIG. 6 shows the day on which the most invoices with mismatches between invoice value and goods receipt value were posted in the general ledger.

In certain examples, a drill down screen may include one or more graphs that illustrate max, min, average, rolling average, cumulative value of X latest instances etc for a given performance metric. These and other metrics may be compared against current or recent event information. In certain examples, different types of charts may be included such as, for example, bar, pie, scatter, with or without formatted grid views.

In certain example embodiments, users can create workflows or issues to be analyzed by other departments or people. For example, certain issues may require someone in the finance department to look at a particular issue (e.g., an invoice above a certain amount has been changed). In certain examples, workflows are automatically created when a certain threshold is crossed or a particular alert is triggered (e.g., invoices above 100 k automatically have workflows created). The workflows can also have required user actions associated with them (e.g., approve, deny, etc).

Figure 7:
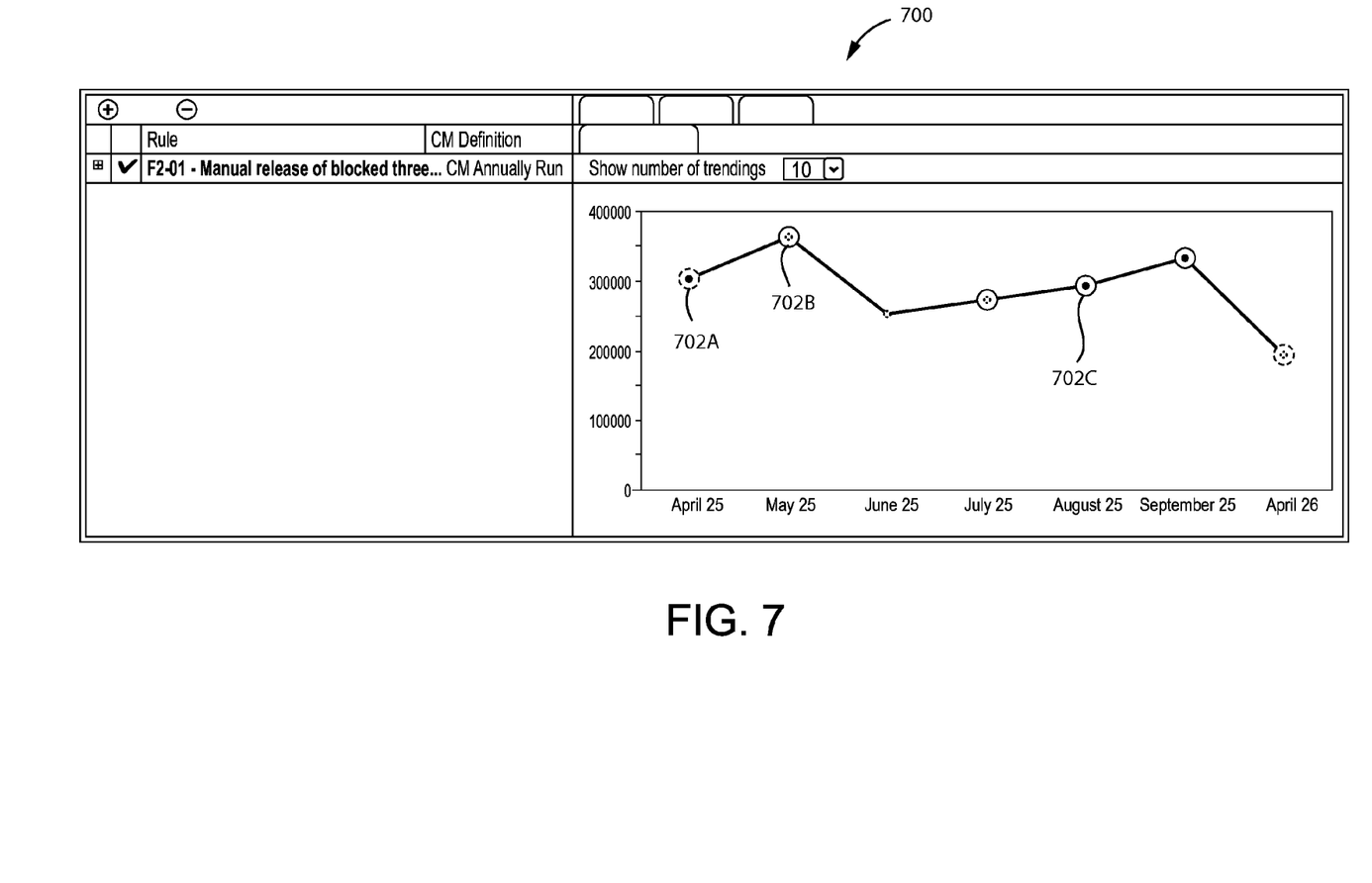
FIG. 7 is an example rule management screen that shows an example rule and whether a user can verify a previously defined constraint of an example system.

In this regard, FIG. 7 is an example rule management screen 700 that shows an example rule and whether a user can verify a previously defined constraint of an example system. Here, a rule summarizes the total invoice amount for invoices that are blocked in the three-way-matching that require manual release. The graph shows positions 702A, 702B, 702C that show results for a particular period.

Figure 8:
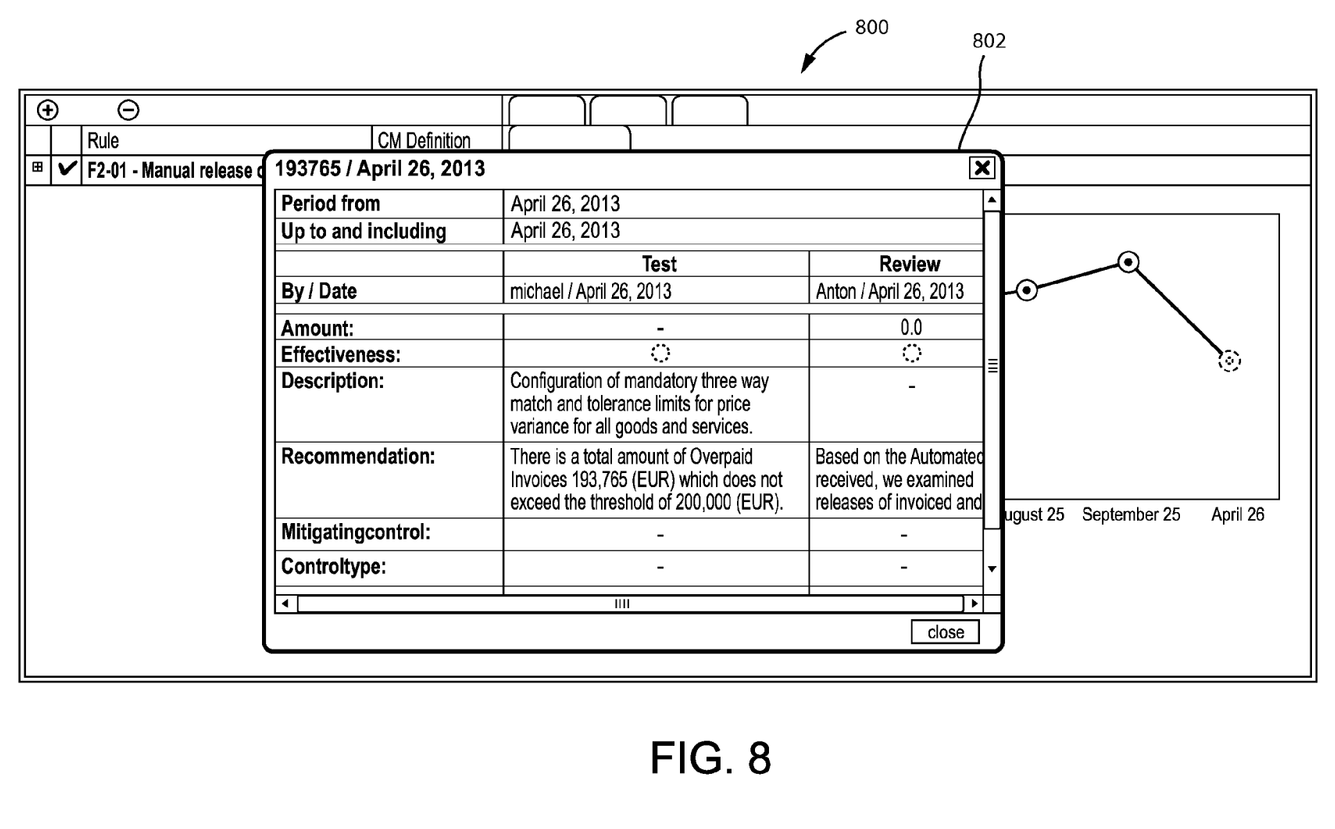
FIG. 8 is a detailed view of properties of a period for which a constraint is executed against according to certain example embodiments.

FIG. 8 includes a screen 800 that shows a further detailed view 802 of properties of a period when a user mouses over certain periods. The detailed results show information from the mined model (e.g., actual process executions), information from the human drawn model (e.g., associated with three-way-matching), process statistics (e.g., the total amount for a given period), and alerts and issues created with the drill-down.

In certain example embodiments, performance metrics may be calculated using average throughput time, the number of times the process has been run, min, max, max in past X period, min in past X period, outside standard deviation of past X periods, etc.

Figure 9:
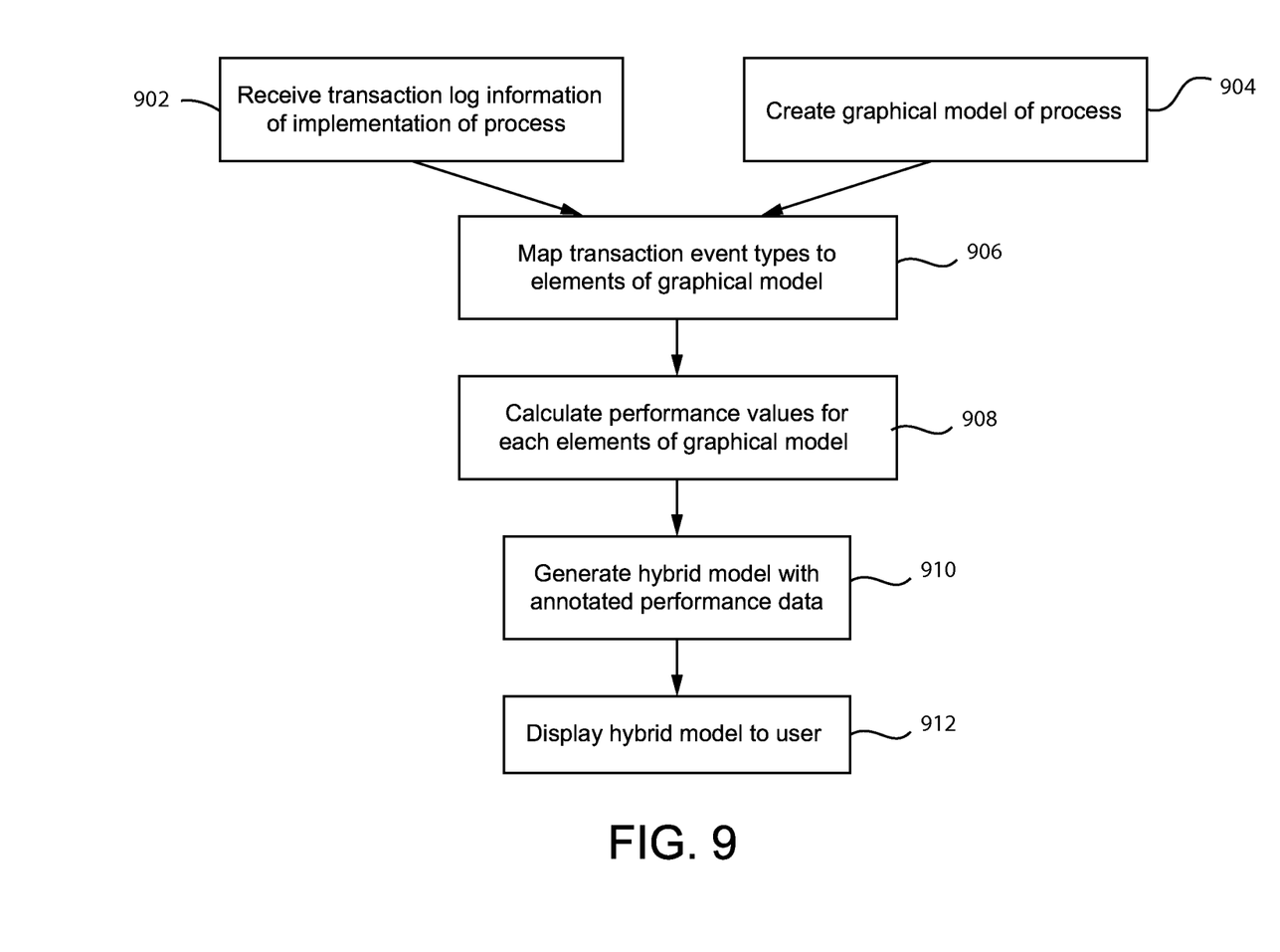
FIG. 9 is a flow chart of an example process for generating a hybrid process model according to certain example embodiments.

FIG. 9 is a flow chart of an example process for generating a hybrid process model according to certain example embodiments.

In step 902, transaction log information is received that is associated with instances of a process that has been executed. As explained herein, this may be an hourly or daily occurrence. In certain instances, this may include receiving this type of information from a customer over a network. In certain examples, the information may additionally, or alternatively, include artifacts of the executed process (e.g., a purchase order and the associated line items).

In step 904, a graphical model is created for the process that is (or will be) used to generate the transaction information. It will be appreciated that steps 902 and 904, while show in parallel may not occur in parallel. For example, the graphical model may be created that may lead to implementation of the process that generated the transaction logs. Conversely, a graphical model may be created based on processes that are currently being executed by users.

In step 906, transaction event types are mapped to elements of the created graphical model. Specifically, the transaction information that is generated from execution of the process may be divided into event types (e.g., create audit entry, generate shipping label, etc). These types of transactions may be mapped to specific model elements of the graphical model (e.g., by using a lookup table or the like). Accordingly, specific transaction events may be automatically linked to certain model elements based on their type.

In step 908, performance values for the model elements (e.g., one or all) are calculated based on transaction information. For example, transactions of a type that has been linked to a specific model element are used in calculating the performance value that is to be associated with that graphical model element. One example of a performance value is throughput time.

In step 910, the hybrid process model is generated. For example, the human created process model is annotated with the performance values calculated in step 908. The resulting model can be an image or a image that includes markup information.

In step 912 the generated hybrid process model is display to a user. The user can then drill down on elements within the hybrid process model, set watches, and obtain information that may not be obtainable absent the hybrid process model with the annotated information.

In certain example embodiments, a hybrid version of a graphical model may be generated and sent to a client for review. In other words, the analysis and generation of the hybrid process model may be done on a service basis where an organization takes the event data from a customer, generates a hybrid process model, and delivers the hybrid process model (as an image or a file) to the customer.

Figure 10:
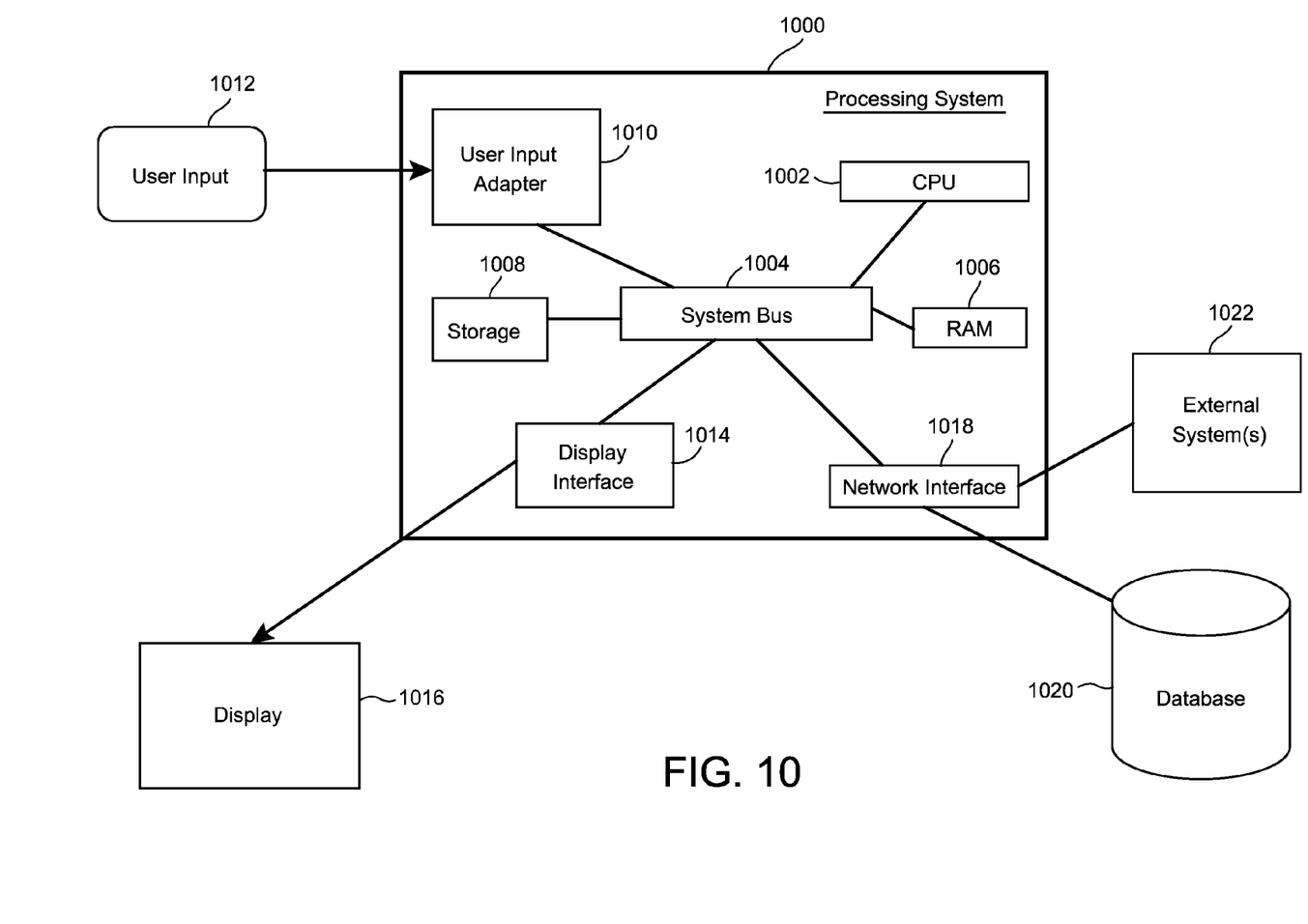
FIG. 10 is a block diagram of an exemplary computing system according to certain example embodiments.

FIG. 10 is a block diagram of an exemplary computing system according to certain example embodiments. A processing system 1000 includes a central processing unit or CPU 1002, a system bus 1004 that communicates with RAM 1006, and storage 1008. The storage 1008 can be magnetic, flash based (e.g., for a mobile client device), solid state, or other storage technology. The system bus 1004 communicates with user input adapter 1010 (e.g., PS/2, USB interface, or the like) that allows users in input commands to processing system 1000 via a user input device 1012 (e.g., a keyboard, mouse, touch panel, or the like). The results of the processing may be displayed to a user on a display 1016 (e.g., an LCD) via display interface 1014 (e.g., a video card or the like).

The processing system 1000 may also include a network interface 1018 (e.g., a transceiver) to facilitate wired (e.g., Ethernet—802.3x) and/or wireless communication (WiFi/802.11x protocols, cellular technology, and the like) with external systems 1022 and/or databases 1020. External systems 1022 may include other processing systems, systems that provide third party services, etc. Here, external systems 1022 may be client devices or server systems.

External systems 1022 may also include network attached storage (NAS) to hold large amounts of data. External systems, along with the internal storage and memory, may form a storage system for storing and maintaining information (e.g., graphical models, event log data, etc). Such a system may communicate with users and/or other computing systems to implement the techniques described herein. The database 1020 may include relational, object orientated, or other types of databases for storing information (e.g., mappings of event types of graphical model elements).

In other words, the processes, techniques, and the like, described herein (for client devices, server, and/or controller systems) may be implemented on a computing system. Such implementations may then configure or program the processing system to carry out aspects according to certain example embodiments. It will be appreciated that other architecture types may be used. For example, a CPU may include multiple CPU "cores." Further, the various elements shown in connection with FIG. 10 may be included into one cohesive physical structure (e.g., such as a tablet device).

Elements of an example computing system may be coupled to other elements. For example a process may be coupled to storage and/or memory. Coupled may include direct (e.g., using a system bus) or indirect access (e.g., retrieving information via a network).

In certain instances, the techniques described herein may facilitate better compliance with laws and regulations of various countries that have been implemented for transaction monitoring and the monitoring of transaction flows to indicate and/or prevent fraud.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A computer system for hybrid modeling a process that includes a plurality of process steps, where the process is implemented in a computing environment where transactional data is generated based on each execution of the process in the computing environment, the computer system comprising:
a computer storage medium configured to store:
a graphical model created independent of the execution of the process in the computing environment, the graphical model created using input from a user, the graphical model including graphical model elements that correspond to the process steps, the graphical model and the graphical model elements being displayable on a display device;
a plurality of transactional events that have been recorded based on discrete executed transactions of the computerized implementation of the process, where each one of the plurality of transactional events is one of a plurality of different transaction event types that respectively correspond to different types of executed transactions; and
mappings of the transaction event types to the graphical models elements, where at least some of the graphical model elements are mapped to plural different transactional event types of the different transaction event types;
a processing system that includes at least one processor coupled the computer storage medium, the processing system configured to:
for each corresponding one of the graphical model elements in the graphical model, calculate a single performance value as a function of multiple transactional events that are of the plural different transactional event types mapped to the corresponding graphical model element;
generate a hybrid version of the created graphical model that includes a graphical representation of the derived performance value for display in association with the one graphical model element;
display device configured to display the hybrid version of the created graphical model; and
a user input device configured to accept input from a user while the hybrid version of the created graphical model is displayed on the display device, the accepted input corresponding to a selected graphical model element of the plurality of graphical models elements, wherein the processing system is further configured to, responsive to the accepted input corresponding to the selected graphical model element, generate and display, to the display device, a drill down view in accordance with the selected graphical model element, the generated drill down view including a graphical display of 1) data that corresponds to each transaction event type associated with the selected graphical model element, and 2) data associated with the graphical model that has not been derived from the plurality of recorded transactional events.

2. The computer system of claim 1, wherein:

the derived performance value for the one graphical model element is a first performance value, the computer storage medium is further configured to store a second performance value for the one graphical model element that is based, at least in part, on prior transactional events, where the second performance value is different from the first performance value, and the processing system is further configured to perform a comparison between the first performance value to the second performance value.

3. The computer system of claim 2, wherein the processing system is further configured to:

automatically perform the comparison between the first performance value to the second performance value;

automatically generate an alert based on the performed comparison; and incorporate a graphical representation of the alert into the hybrid version of the created graphical model.

4. The computer system of claim 2, wherein the second performance value is at least one of the following (1) an average of a plurality of previously-calculated performance values, and (2) a prior performance value for a specific time period.

5. The computer system of claim 1, wherein:

the computer storage medium is further configured to store a constraint that is associated with at least one of the plurality of graphical model elements, the processing system is further configured to automatically perform a determination of whether the constraint associated with the at least one of the plurality of graphical model elements has been violated based on recorded transactional events.

6. The computer system of claim 5, wherein the hybrid version of the created graphical model is generated with a graphical indication of a constraint violation in accordance with the determination that the constraint has been violated.

7. The computer system of claim 1, wherein the derived performance value includes at least one of: a) an average throughput time of the graphical model element based on each computerized implementation of the process; or b) a value that indicates a number of times the process has been run on the computing environment.

8. A computerized method of using a computer system for presenting an augmented display of a graphical model that includes graphical model elements that respectively correspond to process steps of a process implemented in a computing environment that records transactional data based on each execution of the process in the computing environment, the computer system including at least one processor that is coupled to a memory, the method comprising:

creating the graphical model independent of any execution of the process, the graphical model created using input from a user, the graphical model including graphical model elements that correspond to the process steps, the graphical model and the graphical model elements being viewable by the user on a display;

retrieving a plurality of transactional events that have been recorded based on discrete executed transactions of the computerized implementation of the process, where each one of the plurality of transactional events is one of a plurality of different transaction event types that respectively correspond to different types of executed transactions;

mapping the transaction event types to the graphical model elements, where at least some of the graphical model elements are mapped to multiple different transactional event types of the transaction event types;

for each corresponding one of the graphical model elements in the graphical model, calculating, using the at least one processor, a performance value as a function of transactional events of the multiple different transactional event types mapped to the corresponding graphical model element;

generating, using the at least one processor, a hybrid version of the created graphical model that includes a graphical representation of the derived performance value to be displayed in association with the graphical model element;

outputting, to a display device, the hybrid version of the created graphical model;

accepting input from a user while the hybrid version of the created graphical model is displayed on the display device, the accepted input corresponding to a selected graphical model element of the plurality of graphical models elements; and responsive to the accepted input corresponding to the selected graphical model element, generating and displaying, to the display device, a drill down view in accordance with the selected graphical model element, the generated drill down view including a graphical display of 1) data that corresponds to each transaction event type associated with the selected graphical model element, and 2) data associated with the graphical model that has not been derived from the plurality of recorded transactional events.

9. The computerized method of claim 8, further comprising:

automatically performing a determination of whether a constraint that is associated with at least one of the plurality of graphical model elements has been violated based on recorded transactional events.

10. The computerized method of claim 9, wherein the hybrid version of the created graphical model is generated with a graphical indication of a violation of the constraint in accordance with the determination.

11. The computerized method of claim 8, wherein the derived performance value includes at least one of: a) an average throughput time of the graphical model element based on each computerized implementation of the process; or b) a value that indicates a number of times the process has been run on the computing environment.

12. A non-transitory, computer-readable storage medium storing computer readable instructions for use with a computer system for presenting an augmented display of a graphical model that corresponds to a process that is implemented in a computing environment that records discrete transactional data based on each execution of the process in the computing environment, the graphical model being a human-created model that is created independent of any execution of the process on the computing environment, the graphical model including graphical model elements that correspond to the process steps, the graphical model and the graphical model elements being viewable by the user on a display, the computer system including at least one processor, the stored computer readable instructions comprising instructions that, when executed by the at least one processor, configure the computing system to:

retrieve, from a storage device, a plurality of transactional events that have been recorded from the computerized implementation of the process, where each one of the plurality of transactional events is one of a plurality of different transaction event types that respectively correspond to different types of executed transactions;

map the transaction event types to the graphical model elements, where at least some of the graphical model elements are mapped to multiple different transactional event types of the transaction event types;

for each corresponding one of the graphical model elements in the graphical model, calculate, a performance value for at least the graphical model element as a function of the multiple different transactional event types mapped to the corresponding graphical model element;

generate a hybrid version of the created graphical model that includes a graphical representation of the derived performance value displayed in conjunction with the graphical model element;

output, to a display device that is coupled to the computer system, the hybrid version of the created graphical model;

process input that is provided by a user while the hybrid version of the created graphical model is displayed on the display device, the input corresponding a selected graphical model element of the plurality of graphical model elements; and responsive to the accepted input corresponding to the selected graphical model element, generating and displaying, to the display device, a drill down view in accordance with the selected graphical model element, the generated drill down view including a graphical display of 1) data that corresponds to each transaction event type associated with the selected graphical model element, and 2) data associated with the graphical model that has not been derived from the plurality of recorded transactional events.

13. The non-transitory computer readable storage medium of claim 12, wherein the instructions further configure the computing system to:
automatically perform a determination of whether or not a constraint that is associated with at least one of the plurality of graphical model elements has been violated based on recorded transactional events.

14. The non-transitory computer readable storage medium of claim 13, wherein the hybrid version of the created graphical model is generated with a graphical indication of a violation of the constraint in accordance with the determination.

15. The non-transitory computer readable storage medium of claim 12, wherein the derived performance value includes at least one of: a) an average throughput time of the graphical model element based on each computerized implementation of the process; or b) a value that indicates a number of times the process has been run on the computing environment.

16. The non-transitory computer readable storage medium of claim 12, wherein the instructions further configure the computing system to:
store at least one other performance value for the graphical model element that is different from the derived performance value;
perform a comparison between the at least one other performance value and the derived performance value; and
generate an alert based on the performed comparison.

17. The non-transitory computer readable storage medium of claim 16, wherein the stored at least one other performance value is based on: (1) an average of plural previously calculated performance values; or (2) a prior performance value for a specific time period.

* * * * *